United States Patent
Fang

(10) Patent No.: US 9,811,383 B2
(45) Date of Patent: Nov. 7, 2017

(54) PROCESSING A COMPOSITE TASK BASED ON A SEMANTIC RELATION GRAPH

(71) Applicant: EMPIRE TECHNOLOGY DEVELOPMENT LLC, Wilmington, DE (US)

(72) Inventor: Jun Fang, Xi'an (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 149 days.

(21) Appl. No.: 14/647,701

(22) PCT Filed: May 5, 2014

(86) PCT No.: PCT/CN2014/076770
§ 371 (c)(1),
(2) Date: May 27, 2015

(87) PCT Pub. No.: WO2015/168835
PCT Pub. Date: Nov. 12, 2015

(65) Prior Publication Data
US 2016/0041847 A1    Feb. 11, 2016

(51) Int. Cl.
*G06F 9/46*      (2006.01)
*G06F 9/455*     (2006.01)
(Continued)

(52) U.S. Cl.
CPC .............. *G06F 9/5038* (2013.01); *G06F 9/52* (2013.01)

(58) Field of Classification Search
None
See application file for complete search history.

(56) References Cited

U.S. PATENT DOCUMENTS

| 9,245,049 B2 * | 1/2016 | Fang ................. G06F 17/30958 |
| 2006/0147001 A1 * | 7/2006 | Ha ..................... G05B 19/4185 |
| | | 379/90.01 |

(Continued)

FOREIGN PATENT DOCUMENTS

| CN | 101398858 A | 4/2009 |
| JP | H0877199 A | 3/1996 |
| WO | 2012109786 A1 | 8/2012 |

OTHER PUBLICATIONS

"Pellet: OWL 2 Reasoner for Java," accessed at web.archive.org/web/20140409020828/http://clarkparsia.com/pellet, accessed on Feb. 5, 2015, pp. 2.

(Continued)

*Primary Examiner* — Bradley Teets
(74) *Attorney, Agent, or Firm* — Moritt Hock & Hamroff LLP; Steven S. Rubin, Esq.

(57) ABSTRACT

Technologies are generally described for systems, devices and methods effective to process a composite task to be applied to an ontology. In some examples, the methods may include a processor receiving a composite task. The methods may include the processor transforming the composite task into a set of atomic tasks. The set of atomic tasks may include at least a first atomic task, a second atomic task, and a third atomic task. The methods may include the processor determining that the first atomic task is equivalent to the second atomic task based on the ontology. The methods may include the processor removing the second atomic task from the set of atomic tasks to generate a list of atomic tasks. The methods may include the processor applying the list of atomic tasks to the ontology.

16 Claims, 5 Drawing Sheets

(51) Int. Cl.
*G06F 9/50* (2006.01)
*G06F 9/52* (2006.01)

(56) References Cited

U.S. PATENT DOCUMENTS

| | | | |
|---|---|---|---|
| 2007/0083607 A1* | 4/2007 | Thompson | G06F 9/5027 709/217 |
| 2007/0233627 A1* | 10/2007 | Dolby | G06N 5/00 706/45 |
| 2008/0040308 A1 | 2/2008 | Ranganathan et al. | |
| 2010/0100563 A1* | 4/2010 | Corella | G06F 17/30864 707/770 |
| 2011/0088036 A1* | 4/2011 | Patanella | G06F 9/5038 718/102 |
| 2012/0317200 A1 | 12/2012 | Chan | |
| 2015/0046902 A1* | 2/2015 | Kumar | G06F 8/31 717/114 |

OTHER PUBLICATIONS

"SWAT Projects—The Lehigh University Benchmark (LUBM)," accessed at web.archive.org/web/20140408084623/http://swat.cse.lehigh.edu/projects/lubm/, accessed on Feb. 5, 2015, pp. 2.

"The OWL API," accessed at web.archive.org/web/20140327124203/http://owlapi.sourceforge.net/, accessed on Feb. 5, 2015, pp. 2.

Cheptsov, A., and Assel, M., "Parallelization Techniques for Semantic Web Reasoning Applications," accessed at ceur-ws.org/Vol-658/paper453.pdf, accessed on Feb. 5, 2015, pp. 1-4.

Gracia, J., and Mena, E., "Web-Based Measure of Semantic Relatedness," Proceedings of the 9th international conference on Web Information Systems Engineering, vol. 5175, pp. 136-150 (2008).

Holmes, D.W., et al., An Events Based Algorithm for Distributing Concurrent Tasks on Multi-Core Architectures, Computer Physics Communications, vol. 181, No. 2, pp. 341-354 (2010).

International Search Report and Written Opinion for counterpart International Patent Application No. PCT/CN2014/076770 mailed Jan. 21, 2015, 8 pages.

Liebig, T., et al., "Scalability via Parallelization of OWL Reasoning," Proceedings of the 4th Workshop on New Forms of Reasoning for the Semantic Web: Scalable & Dynamic, NeFORS, pp. 1-5 (2010).

Wang, H., et al., "Concurrent reasoning of fuzzy logical Petri nets based on multi-task schedule," IEEE Transactions on Fuzzy Systems, vol. 9, No. 3, pp. 444-449 (Jun. 2001).

Zhuge, H., "Communities and Emerging Semantics in Semantic Link Network: Discovery and Learning," IEEE Transactions on Knowledge and Data Engineering, vol. 21, No. 6, pp. 785-799 (Jul. 15, 2008).

* cited by examiner

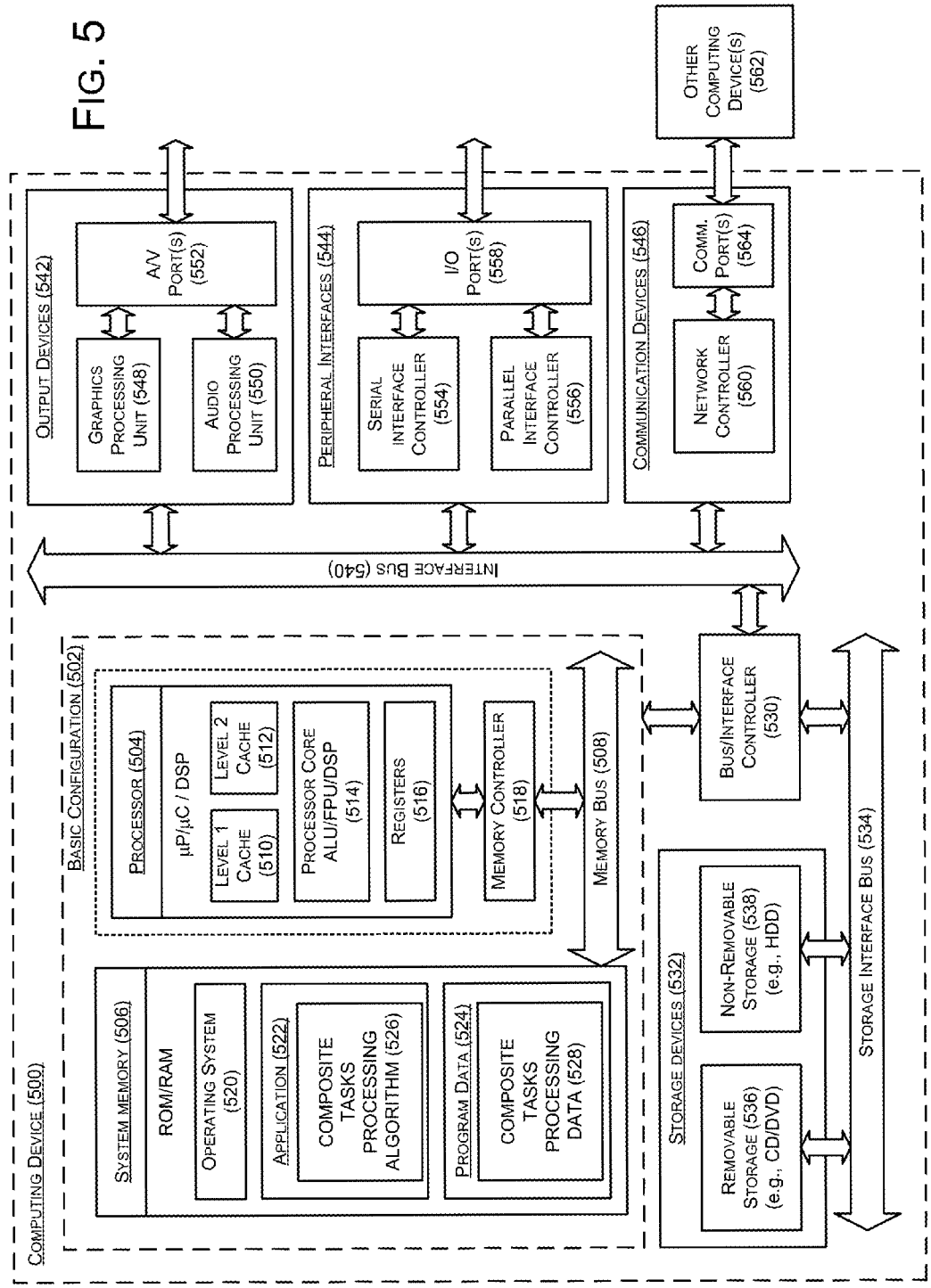

PROCESSING A COMPOSITE TASK BASED ON A SEMANTIC RELATION GRAPH

CROSS-REFERENCE TO RELATED APPLICATION

This Application is a U.S. National Stage filing under 35 U.S.C. §371 of International Application Ser. No. PCT/CN2014/076770, filed on May 5, 2014. International Application Ser. No.PCT/CN2014/076770 is hereby incorporated herein by reference in its entirety.

BACKGROUND

Unless otherwise indicated herein, the materials described in this section are not prior art to the claims in this application and are not admitted to be prior art by inclusion in this section.

In a parallel processing arrangement, more than one central processing unit (CPU) or processor core may execute a program or multi computational threads. A parallel processing arrangement may execute instructions faster than serial processing. The program may be divided in such a way that separate CPUs or cores can execute different portions of the program without interfering with each other.

SUMMARY

In an example, methods effective to process a composite task to be applied to an ontology are described. The methods may include a processor receiving the composite task. The methods may include the processor transforming the composite task into a set of atomic tasks. The set of atomic tasks may include at least a first atomic task, a second atomic task, and a third atomic task. The methods may include the processor determining that the first atomic task is equivalent to the second atomic task based on the ontology. The methods may include the processor removing the second atomic task from the set of atomic tasks to generate a list of atomic tasks. The methods may include the processor applying the list of atomic tasks to the ontology.

In an example, methods effective to process a composite task to be applied to an ontology are described. The methods may include a processor receiving the composite task. The methods may include the processor transforming the composite task into a set of atomic tasks. The set of atomic tasks may include at least a first atomic task, a second atomic task, and a third atomic task. The methods may include the processor analyzing a semantic relationship between the first atomic task, the second atomic task and the third atomic task based on a semantic relation graph. The semantic relation graph may be based on the ontology. The methods may include the processor determining a first semantic relationship between the first atomic task and the second atomic task. The first atomic task may be more semantically restrictive than the second atomic task. The methods may include the processor determining a second semantic relationship between the second atomic task and the third atomic task. The second atomic task may be more semantically restrictive than the third atomic task. The methods may include the processor generating an ordered list of the first atomic task, the second atomic task and the third atomic task based on the determined first and second semantic relationships.

In an example, devices configured to process a composite task to be applied to an ontology are described. The devices may include a processor and a memory. The memory may include the ontology, a semantic relation graph, and instructions. The instructions, when executed by the processor, may cause the processor to receive the composite task. The instructions, when executed by the processor, may cause the processor to transform the composite task into a set of atomic tasks. The set of atomic tasks may include at least a first atomic task, a second atomic task, and a third atomic task. The instructions, when executed by the processor, may cause the processor to determine the first atomic task is equivalent to the second atomic task based on the semantic relation graph. The instructions, when executed by the processor, may cause the processor to remove the second atomic task from the set of atomic tasks to generate a list of atomic tasks. The instructions, when executed by the processor, may cause the processor to order the list of atomic tasks based on the semantic relation graph. The instructions, when executed by the processor, may cause the processor to apply the ordered list of atomic tasks to the ontology.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5 is a block diagram illustrating an example computing device that is arranged to process composite tasks, all arranged in accordance with at least some embodiments described herein.

DETAILED DESCRIPTION

Figure 1:
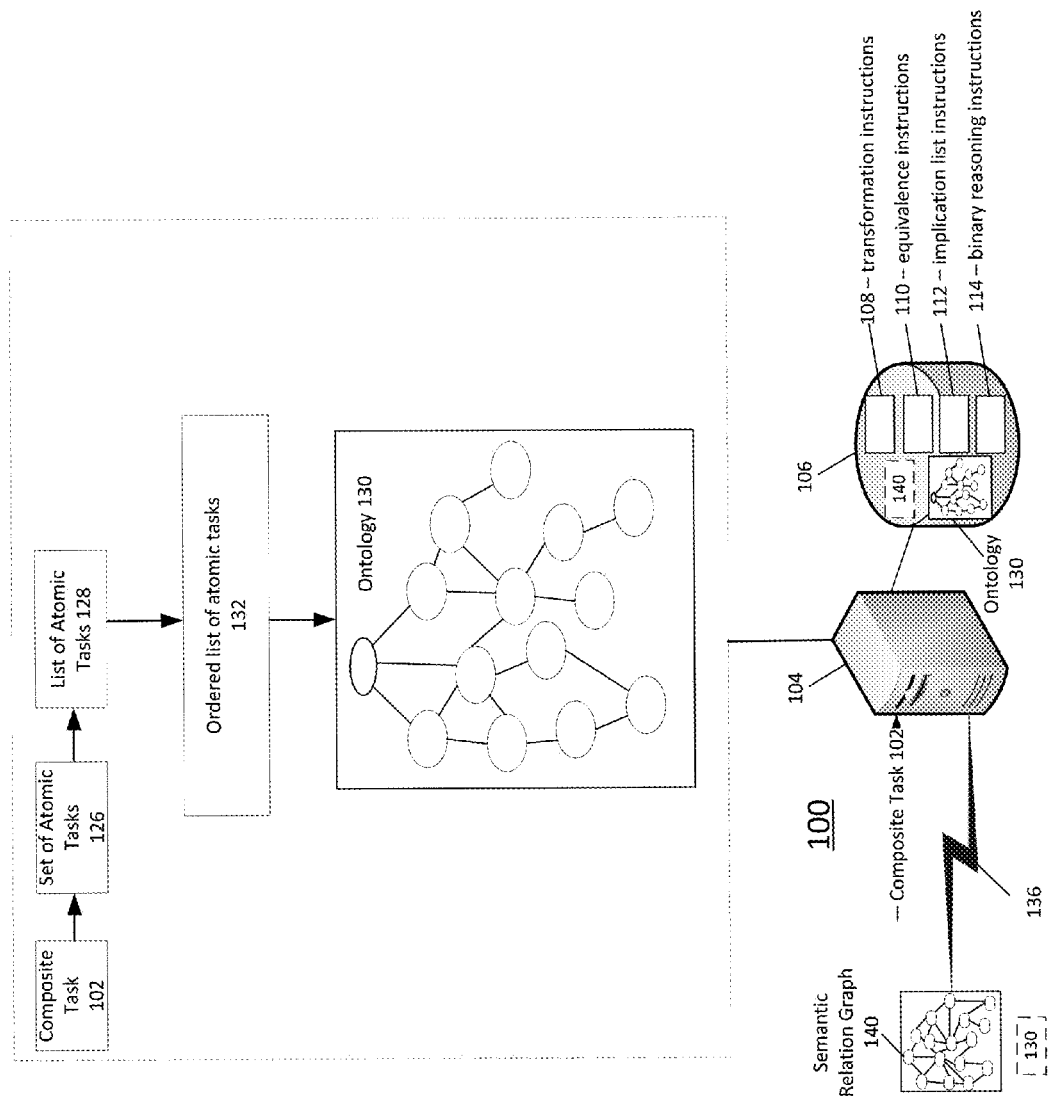
FIG. 1 illustrates an example composite task processor system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a composite task processor.

Briefly stated, technologies are generally described for systems, devices and methods effective to process a composite task to be applied to an ontology. The ontology may include nodes representing concepts, and links between the nodes representing relationships among the concepts. The methods may include a processor receiving a composite task. For example, a composite task may include multiple tasks for the processor to apply to the ontology. In an example, the ontology may relate to mathematics (or math) and the composite task may be a request to find the area of a complicated shape. The methods may include the processor transforming the composite task into a set of atomic tasks such as tasks to find the area of simpler shapes like circles. For example, the composite task may include multiple smaller tasks or atomic tasks to be applied to the ontology. The set of atomic tasks may include at least a first atomic task, a second atomic task, and a third atomic task. The methods may include the processor determining that the first atomic task is equivalent to the second atomic task based on the ontology. For example, the ontology may be a math ontology. The first atomic task and the second atomic task may both relate to determining the area of a circle. Based on a math ontology, the first and second atomic tasks may be determined to the equivalent. The methods may include the processor removing the second atomic task from the set of atomic tasks to generate a list of atomic tasks. For example, if the first atomic task is equivalent to the second atomic task, then only one of the atomic tasks may need to be applied to the ontology to process the composite task. The methods may include the processor applying the list of atomic tasks to the ontology.

FIG. 1 illustrates an example composite task processor system, arranged in accordance with at least some embodiments described herein. As discussed in more detail below, in some examples, a system 100 may include a processor 104 and a memory 106. Processor 104 may be configured to be in communication with memory 106. Memory 106 may include an ontology 130, a semantic relation graph 140, transformation instructions 108, equivalence instructions 110, implication list instructions 112, and binary reasoning instructions 114. Processor 104 may also be configured to be in communication with ontology 130 and semantic relation graph 140 over a network 136 if ontology 130 and semantic relation graph 140 are not stored in memory 106. As discussed in more detail below, processor 104 may process composite task 102 and apply composite task 102 to ontology 130.

In one example, processor 104 may receive one or more composite tasks 102. Composite task 102 may include multiple reasoning requests or atomic tasks to be applied to ontology 130 by processor 104. Processor 104 may process composite task 102 by executing transformation instructions 108 to transform composite task 102 into a set of atomic tasks 126. Atomic tasks in set of atomic tasks 126 may be subset tasks of composite task 102 where each atomic task in set of atomic tasks 126 may be a task that may be difficult to further divide into smaller tasks. For example, if composite task 102 is "take care of dog", atomic tasks in set of atomic tasks 126 may include; "feed dog", "give dog water", "walk dog", "clean up after dog", "groom dog", etc. Processor 104 may transform composite task 102 into set of atomic tasks 126 such that atomic tasks in set of atomic tasks 126 are in standard form descriptive logic notations and symbols—explained in more detail below.

Processor 104 may execute equivalence instructions 110 on atomic tasks in set of atomic tasks 126. In executing equivalence instructions 110, processor 104 may utilize semantic relation graph 140 to determine atomic tasks in set of atomic tasks 126 which are semantically equivalent within semantic relation graph 140. For example, the atomic tasks "feed the dog" and "give the dog dinner" may be semantically equivalent in semantic relation graph 140 and in ontology 130. Semantic relation graph 140 may be constructed prior to processor 104 receiving composite task 102, may be generated based on ontology 130 and may illustrate relationships between standard form descriptive logic notations and symbols in ontology 130—explained in more detail below. Semantic relation graph 140 may reflect semantic relationships between the atomic tasks in set of atomic tasks 126.

Processor 104 may generate a list of atomic tasks 128 from set of atomic tasks 126 by removing all but one of each atomic task in set of atomic tasks 126 determined to be equivalent. For example, if atomic task A and atomic task B are determined to be equivalent, processor 104 may remove all instances of atomic task A and atomic task B from set of atomic tasks 126, except for one instance of atomic task A of atomic task B, to generate list of atomic tasks 128.

Processor may execute implication list instructions 112 on list of atomic tasks 128. In executing implication list instructions 112, processor 104 may utilize semantic relation graph 140 to order list of atomic tasks 128 and generate ordered list of atomic tasks 132. Ordered list of atomic tasks 132 may include atomic tasks that are related within semantic relation graph 140 such as one atomic task implying or being more semantically restrictive than another, related atomic task. For example, if an individual can legally drive a car, than this may imply that the individual has a license; and having a license may imply that the individual is over sixteen years old. In the previous example, ordered list of atomic tasks 132 may include: can legally drive a car→has a license→over sixteen years old.

Processor 104 may execute binary reasoning instructions 114 on ordered list of atomic tasks 132 to determine atomic tasks to apply to ontology 130. For example, if the more semantically restrictive task "take care of dog" can be processed, then processor 104 need not thereafter process the less semantically restrictive task "feed the dog." Processor 104, executing binary reasoning instructions 114, may select an atomic task from approximately the middle of ordered list of atomic tasks 132 to apply to ontology 130. For example, if there are n atomic tasks in ordered list of atomic tasks 132, processor 104 may select atomic task at position n/2 within ordered list of atomic tasks 132 where n/2 is an integer. If n/2 is not an integer, processor 104 may select atomic task at position (n+1)/2. Processor 104 may receive a response to applying the selected atomic task to ontology 130. A response from applying the selected atomic task to ontology 130 may indicate whether processor 104 can execute the selected atomic task and less semantically restrictive tasks. Based on the response and binary reasoning instructions 114, processor 104 may select a second atomic task from ordered list of atomic tasks 132 to apply to ontology 130. Processor 104 executing binary reasoning instructions 114 and applying atomic tasks from ordered list of atomic tasks 132 to ontology 130, may determine which atomic tasks within ordered list of atomic tasks 132 must be executed and applied to ontology 130 to execute composite task 102. For example, if composite task 102 is to determine habits of drivers with low insurance rates, and binary reasoning instructions are executed on ordered list of atomic tasks 132 (can legally drive a car→has a license→over sixteen years old), then processor 104 may only apply the atomic task of determining whether an individual "can legally drive a car" to ontology 130. A response to this atomic task may indicate that ontology 130 may be able to determine an individual can legally drive a car. As a consequence, the atomic tasks of determining an individual "has a license" and determining an individual is "over sixteen years of age" may not be applied to ontology 130 as these two atomic tasks are implied by the first atomic task of determining an individual "can legally drive a car." Processor 104 may apply atomic tasks from ordered list of atomic tasks 132 with use of binary reasoning instructions 114 to ontology 130 to execute composite task 102. Use of binary reasoning instructions 114 may result in less processing time, less processing memory, and less power than applying all atomic tasks in ordered list of atomic tasks 132 on ontology 130.

Figure 2:
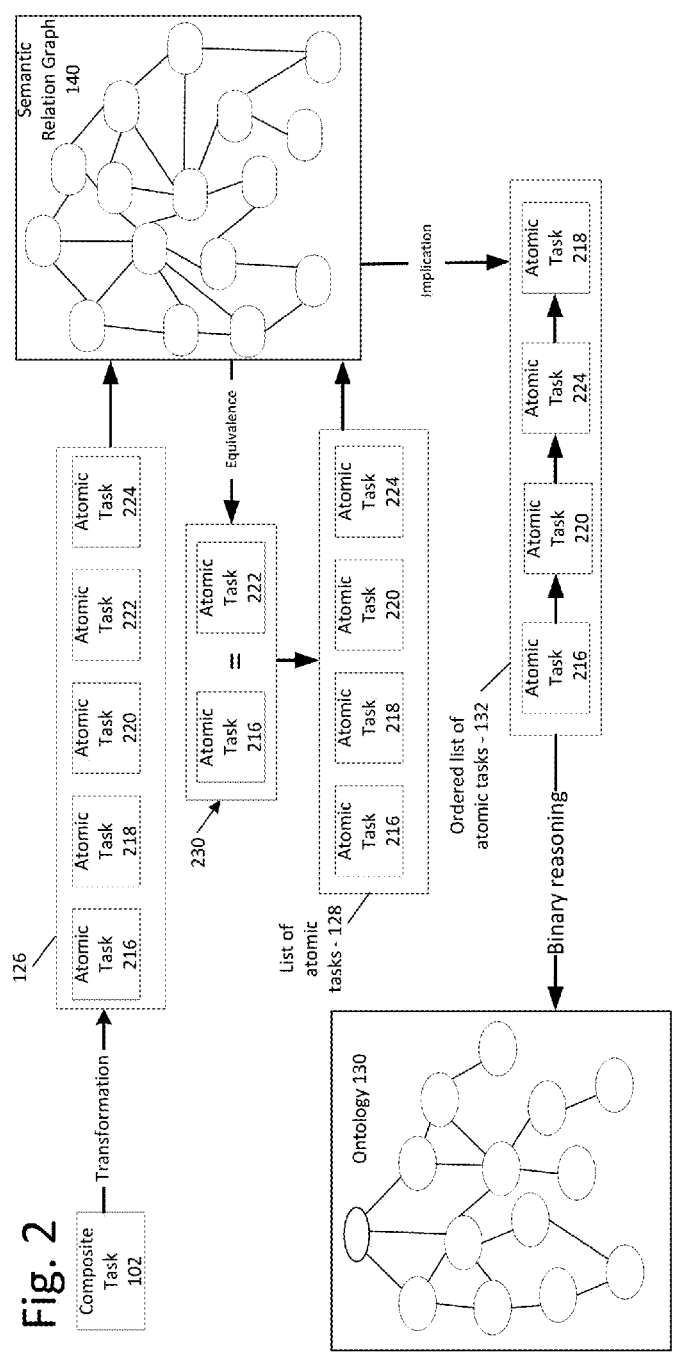
FIG. 2 illustrates the example composite task processor system of FIG. 1 with additional details relating to atomic tasks.
Figure 2:
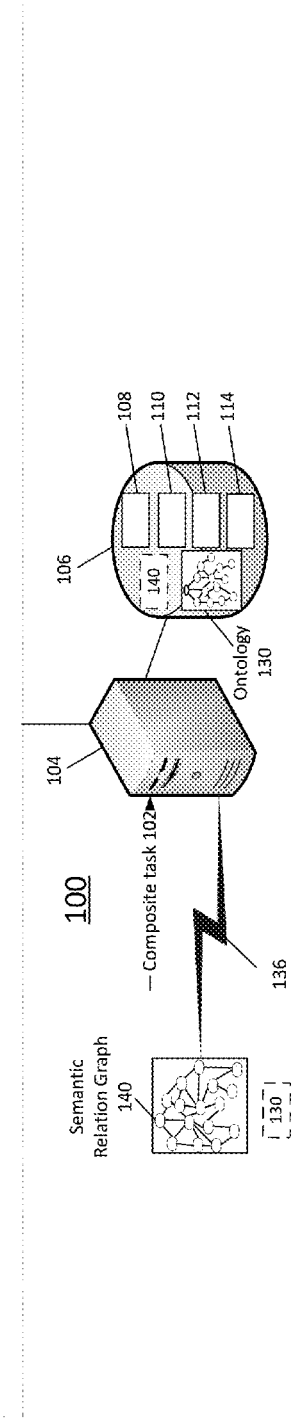

FIG. 2 illustrates example composite task processor system 100 of FIG. 1 with additional details relating to atomic tasks, arranged in accordance with at least some embodiments described herein. FIG. 2 is substantially similar to FIG. 1, with additional details. Those components in FIG. 2 that are labeled identically to components of FIG. 1 will not be described again for the purposes of clarity.

In one example, processor 104 may receive composite task 102. Composite task 102 may include multiple reasoning requests or atomic tasks to be applied to ontology 130 by processor 104. Processor 104 may process composite task 102 by executing transformation instructions 108 to transform composite task 102 into set of atomic tasks 126, including atomic task 216, atomic task 218, atomic task 220, atomic task 222, and atomic task 224.

Ontology 130 may include standard form descriptive logic notations that may be used to model concepts, roles, and individuals, and the relationships therebetween. Ontology 130 may include axioms in descriptive logic notation relating concepts and/or roles within ontology 130. Axioms within ontology 130 may denote semantic data or knowledge and links between axioms may denote relationships among axioms. Ontology 130, may be looked at as an axiom set, and may be used to denote a semantic data set or a knowledge base. Ontology 130 may include descriptive logic notation that may include the standard logic notation of the Semantic Web.

Processor 104, executing transformation instructions 108, may transform composite task 102 into standard form descriptive logic notations. Composite task 102, transformed into standard form descriptive logic notation may include inclusion axioms. Transformation instructions 108 may include instructions to transform inclusion axioms in composite task 102 into concepts. Transformation instructions 108 may include instructions to subsequently transform concepts in composite task 102, including concepts derived from transforming inclusion axioms in composite task 102, into a negation normal form. Transformation instructions 108 may include a negation normal form of a concept, for example, when negation occurs only in front of a concept name. Transformation instructions 108 may include instructions to subsequently transform the negation normal form concepts into a conjunction form. Transformation instructions 108 may include instructions to separate concepts or assertions connected with the conjunctions into different atomic tasks.

Processor 104 may further execute transformation instructions 108 to transform queries in composite task 102 into assertions. For example, a query in composite task 102 may be transformed into multiple assertions. Processor 104, executing transformation instructions 108, may separate the assertions transformed from queries in composite task 102 into atomic tasks to be applied to ontology 130. Processor 104 may transform inclusion axioms, concepts, assertions, and queries in composite task 102 into set of atomic tasks 126.

Semantic relation graph 140 may be constructed prior to processor 104 receiving composite task 102 and may be generated based on ontology 130. Semantic relation graph 140, based on ontology 130, may illustrate relationships between standard form descriptive logic notations and symbols in ontology 130. Semantic relation graph 140 may be generated by processor 104 and stored in memory 106. Processor 104 may be configured to be in communication with semantic relation graph 140 over a network 136 if semantic relation graph 140 was not generated by processor 104 and/or is not stored in memory 106. Semantic relation graph 140 may include semantic relationships between symbols of ontology 130. Semantic relationships in semantic relation graph 140 may include semantic relations between pairs of symbols. For example, a first and a second symbol may be related in semantic relations graph 140 as equivalent, the first symbol may be more semantically restrictive than the second symbol, or the second symbol may be more semantically restrictive than the first symbol. Semantic relationships between symbols on an ontology may be used to determine relationships between atomic tasks in set of atomic tasks 126.

Processor 104 or another processor may construct semantic relation graph 140 based on ontology 130. A semantic relationship may be determined for all symbols within ontology 130. The determined semantic relationships between all symbols of ontology 130 may be represented in semantic relation graph 140. Semantic relation graph 140 may be constructed by determining a semantic relationship between a first symbol and a second symbol of ontology 130, until every possible pair combination of symbols in ontology 130 is related on semantic relation graph 140. In one example, processor 104 may check a semantic relationship between a first symbol and a second symbol. Processor 104 may determine the first symbol semantically equivalent to the second symbol. Processor 104 may determine the first symbol more semantically restrictive than the second symbol. Processor 104 may determine the second symbol more semantically restrictive than the first symbol. Processor 104 may graph the first and second symbols on semantic relation graph 140 with the determined semantic relationship. Processor 104 may continue to determine semantic relationships between pairs of symbols of ontology 130 until all pair combinations have been graphed on semantic relation graph 140. Processor 104 may construct semantic relation graph 140 prior to receiving composite task 102.

An example construction of a semantic relation graph 140 ("SG") based on ontology 130 represented by O and first and second symbols represented by $s_i$ and $s_j$ is presented below.

Input: an ontology O;
Output: a graph SG;
1: for each pair ($s_i$ and $s_j$) where $s_i$, $s_j \in$ O
2: check semantic relation between $s_i$, $s_j$ using the definition below
3: if $s_i = s_j$ then
4: build $s_i \leftrightarrow s_j$ into graph SG
5: else if $s_i \gg s_j$ then
6: build si →j into graph SG
7: if $s_i \ll _{sj}$ then
8: build $s_i \leftarrow s_j$ into SG Reasoning for composite task 102 may be determined by the semantic interpretation of symbols within composite task 102. A semantic interpretation for a symbol in ontology 130 may be determined by a syntactic definition of the symbol. Semantic relationships between symbols within ontology 130 may be based on the symbols syntactic definitions.

Definition: Given ontology O, $s_1$ and $s_2$ are two symbols in ontology O

Let A(s) denote all axioms which contain s in ontology O
$A(s)^{s \to s'}$ represents replacing symbols s with s' for all axioms A(s)
1. If $A(s_1)^{s1 \to s2} = A(s_2)$, then $s_1$ and $s_2$ are semantically equivalent, denoted by $s_1 = s_2$.
2. If $A(s_1)^{s1 \to s2} \supseteq A(s_2)$, then $s_1$ is more semantically restricted than $s_2$, denoted by $s_1 \ll s_2$.
3. If $A(s_1)^{s1 \to s2} \subseteq A(s_2)$, then $s_2$ is more semantically restricted than $s_1$, denoted by $s_1 \gg s_2$.

This definition of the semantic relationships between two symbols of ontology 130 may be used to construct semantic relation graph 140.

Processor 104 may execute equivalence instructions 110 on atomic tasks 216, 218, 220, 222, and 224. For example, processor 104 may utilize semantic relation graph 140 to determine those of atomic tasks 216, 218, 220, 222, 224 which are semantically equivalent within semantic relation graph 140. Semantic relation graph 140 may include semantic relationships among atomic tasks 216, 218, 220, 222, 224. In an example, as shown at 230, processor 104 may, by executing equivalence instructions 110, utilize semantic relation graph 140 to determine that atomic task 216 is semantically equivalent to atomic task 222. Processor 104 may generate list of atomic tasks 128 from set of atomic tasks 126 by removing all but one of atomic tasks 216 and 222 determined to be equivalent. Processor 104 may determine that list of atomic tasks 128 includes atomic tasks 216, 218, 220, and 224.

Processor 104 may execute implication instructions 112 on atomic tasks 216, 218, 220, and 224 in list of atomic tasks 128 and may utilize semantic relation graph 140 to generate ordered list of atomic tasks 132. Ordered list of atomic tasks 132 may include atomic tasks that imply other atomic tasks within semantic relation graph 140. For example, processor 104 may utilize semantic relation graph 140 to generate ordered list of atomic tasks 132—that includes atomic tasks 216, 218, 220, and 224. Semantic relation graph 140 may identify atomic task 216 as implying atomic task 220, identify atomic task 220 as implying atomic task 224, and identify atomic task 224 as implying atomic task 218. Processor 104 may determine ordered list of atomic tasks 132 including atomic tasks 216, 218, 220, and 224 as: 216→220→224→218.

Processor 104 may execute binary reasoning instructions 114 on ordered list of atomic tasks 132. Processor 104 may, by executing binary reasoning instructions 114 on ordered list of atomic tasks 132, determine which of atomic tasks 216, 220, 224, 218 to apply to ontology 130. Processor 104, executing binary reasoning instructions 114, may select an atomic task from approximately the middle of an ordered list of atomic tasks 132 to apply to ontology 130. For example, ordered list of atomic tasks 132 may include ordered atomic tasks 216, 220, 224, 218 to apply to ontology 130. Processor 104 may execute binary reasoning instructions 114 and apply atomic task 220 to ontology 130. Processor 104 may receive a response to applying atomic task 220 to ontology 130. A response from applying an atomic task to ontology 130 may indicate whether processor 104 can execute the atomic task on ontology 130. Based on the response and binary reasoning instructions 114, processor 104 may select a second atomic task from ordered list of atomic tasks 132 to apply to ontology 130. For example, the response may indicate that atomic task 220 can be executed on ontology 130. As a consequence, processor 104 may determine that atomic tasks 224 and 218 do not need to be applied to ontology 130 and may select atomic task 216 as the next atomic task to apply to ontology 130.

Among other potential benefits, a system in accordance with the disclosure may take less time and use less processing resources to process a composite task. The system may avoid duplicate processing by identifying equivalent atomic tasks of a composite task and only process the equivalent atomic tasks once, saving processing time and other processing resources such as battery life, energy consumption, and memory requirements. The system may also avoid unnecessary processing by determining atomic tasks that do not need to be applied to the ontology based on the ordered list, thus lowing the number of atomic tasks to apply to the ontology and reducing processing time and resources. Concurrent reasoning tasks may be processed efficiently.

Experimental Data

Simulations were run using a descriptive logic reasoner (PELLET) and an application programmable interface (API) for ontology manipulation (OWLAPI) on several Lehigh University Benchmark (LUBM) ontologies. LUBM ontologies ranged from $10^5$ axioms to $10^6$ axioms with corresponding number of reasoning tasks from $10^4$ to $10^6$. The syntax used was SHIF(D).

TABLE 1

| Ontology | Syntax | |Axioms| | Total Size (MB) | |reasoning tasks| |
|---|---|---|---|---|
| LUBM-Lite1$_{+10k}$ | SHIF(D) | 100,729 | 8.03 | $10^4$ |
| LUBM-Lite10$_{+50k}$ | | 1,001,738 | 80.7 | $5 \times 10^4$ |
| LUBM-Lite50$_{+100k}$ | | 5,096,008 | 697.2 | $10^6$ |

All experiments were run on a 2.60 GHz PENTIUM-4 processor with 4 GB of physical memory and with a maximum Java heap size set to 3072 MB for applying PELLET. First, a semantic relation graph 140 was constructed for each ontology 130. Construction of semantic relation graph 140 may be done prior to receiving composite task to process and may be done off line.

TABLE 2

| Ontology | Execution Time (s) | Graph Size (MB) |
|---|---|---|
| LUBM-Lite1 | 747 | 8.78 |
| LUBM-Lite10 | 3,847 | 90.7 |
| LUBM-Lite50 | 13,276 | 901.2 |

Experimental results indicate construction time of dozens of minutes for ontology 130 of about $10^5$ axioms (LUBM-Lite1) to several hours for ontology 130 of about $5 \times 10^6$ axioms (LUBM-Lite50). The experimental results illustrate the construction of semantic relation graph 140 may be completed in a reasonable amount of time. For ontology 130, semantic relation graph 140 need only be constructed once, and may be constructed prior to receiving composite task 102 to process. Semantic relation graph 140 may be loaded into memory 106. Semantic relation graph 140 may require slightly more memory than ontology 130 from which semantic relation graph 140 is constructed.

TABLE 3

| | Total Execution Time (s) | | |
| --- | --- | --- | --- |
| | Non-optimized | Present Method | |
| Ontology | method | Ordered | Binary |
| LUBM-Lite1$_{+10k}$ | 6.2 | 0.6 | 2.1 |
| LUBM-Lite10$_{+50k}$ | 150.6 | 12.1 | 20.3 |
| LUBM-Lite50$_{+100k}$ | 2,063.5 | 50.6 | 232.5 |

Table 3 illustrates the experimental amount of time to process composite task 102 for the three ontologies 130 by standard processing of the entire composite task (Non-optimized method) and the present method. Table 3 includes columns for amounts of time to generate ordered lists and binary reasoning. As shown, the present method completed composite task 102 in significantly less time. For ontology 130 with $10^5$ axioms (LUBM-Lite1$_{+10K}$) processing time was decreased to about half and for ontology 130 with $10^6$ axioms (LUBM-Lite50$_{+100K}$) processing time was reduced by over 85%.

TABLE 4

| | Actual Number of Tasks | |
| --- | --- | --- |
| Ontology | Non-optimized method | Present |
| LUBM-Lite1$_{+10k}$ | 10,000 | 2,078 |
| LUBM-Lite10$_{+50k}$ | 50,000 | 7,836 |
| LUBM-Lite50$_{+100k}$ | 100,000 | 13,765 |

Table 4 illustrates the number of tasks applied to ontology 130 to process composite task 102. As shown, the number of tasks applied to ontology 130 is significantly reduced by the present method. For ontology 130 with $10^5$ axioms (LUBM-Lite1$_{+10K}$) the number of tasks to apply to ontology 130 was decreased by just under 80% for ontology 130 with $10^6$ axioms (LUBM-Lite50$_{+100K}$) the number of tasks to apply to ontology 130 was decreased by over 86%.

Figure 3:
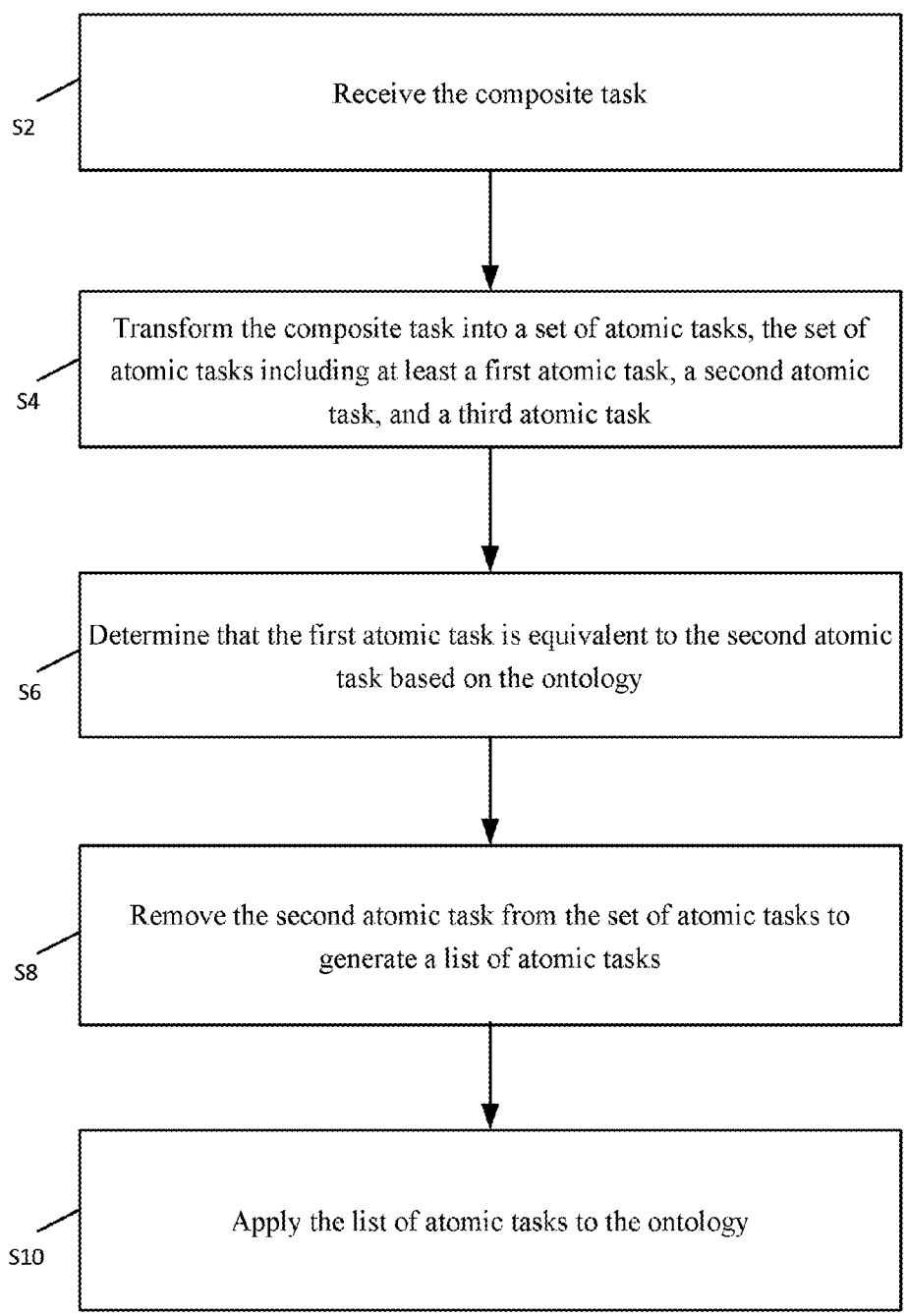
FIG. 3 depicts a flow diagram for example processes to process composite tasks.

FIG. 3 illustrates a flow diagram for example processes to process composite tasks, arranged in accordance with at least some embodiments presented herein. The process in FIG. 3 could be implemented using, for example, system 100 discussed above. An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation.

Processing may begin at block S2, "Receive the composite task." At block S2, the processor may receive the composite task. The composite task may include multiple reasoning requests or atomic tasks to be applied to an ontology by the processor.

Processing may continue from block S2 to block S4, "Transform the composite task into a set of atomic tasks, the set of atomic tasks including at least a first atomic task, a second atomic task, and a third atomic task." At block S4, the processor may transform the composite task into a set of atomic tasks. The set of atomic tasks may include at least a first atomic task, a second atomic task, and a third atomic task. The atomic tasks in the set of atomic tasks may be subset tasks of the composite task which may be difficult to divide into smaller tasks. The processor may transform the composite task into the set of atomic tasks such that the atomic tasks in the set of atomic tasks are in standard form descriptive logic notations and symbols.

Processing may continue from block S4 to block S6, "Determine that the first atomic task is equivalent to the second atomic task based on the ontology." At block S6, the processor may determine that the first atomic task is equivalent to the second atomic task. The determination may be based on the ontology. The processor may utilize a semantic relationship graph to determine atomic tasks in the set of atomic tasks which are semantically equivalent within the semantic relation graph. The semantic relation graph may be constructed prior to the processor receiving the composite task. The semantic relation graph may be generated based on the ontology and may illustrate relationships between standard form descriptive logic notations and symbols in the ontology. The semantic relationship graph may include semantic relationships between atomic tasks of the ontology.

Processing may continue from block S6 to block S8, "Remove the second atomic task from the set of atomic tasks to generate a list of atomic tasks." At block S8, the processor may remove the second atomic task from the set of atomic tasks to generate a list of atomic tasks. The processor may generate the list of atomic tasks from the set of atomic tasks by removing all but one of each atomic task in the set of atomic tasks determined to be equivalent.

Processing may continue from block S8 to block S10, "Apply the list of atomic tasks to the ontology." At block S10, the processor may apply the list of atomic tasks to the ontology. The processor may utilize the semantic relationship graph to order the list of atomic tasks to generate an ordered list of atomic tasks prior to applying the list of atomic tasks to the ontology. The ordered list of atomic tasks may include atomic tasks that are related within the semantic relationship graph such as one atomic task implying another atomic task. The processor may select an atomic task from approximately the middle of the ordered list of atomic tasks to apply to the ontology. The processor may receive a response to applying the selected atomic task to the ontology. A response from applying the atomic task to the ontology may indicate whether the ontology can execute the atomic task. Based on the response, the processor may select a second atomic task from the ordered list of atomic tasks to apply to the ontology. The processor may determine atomic tasks within the ordered list of atomic tasks that should be applied to the ontology to execute the composite task.

Figure 4:
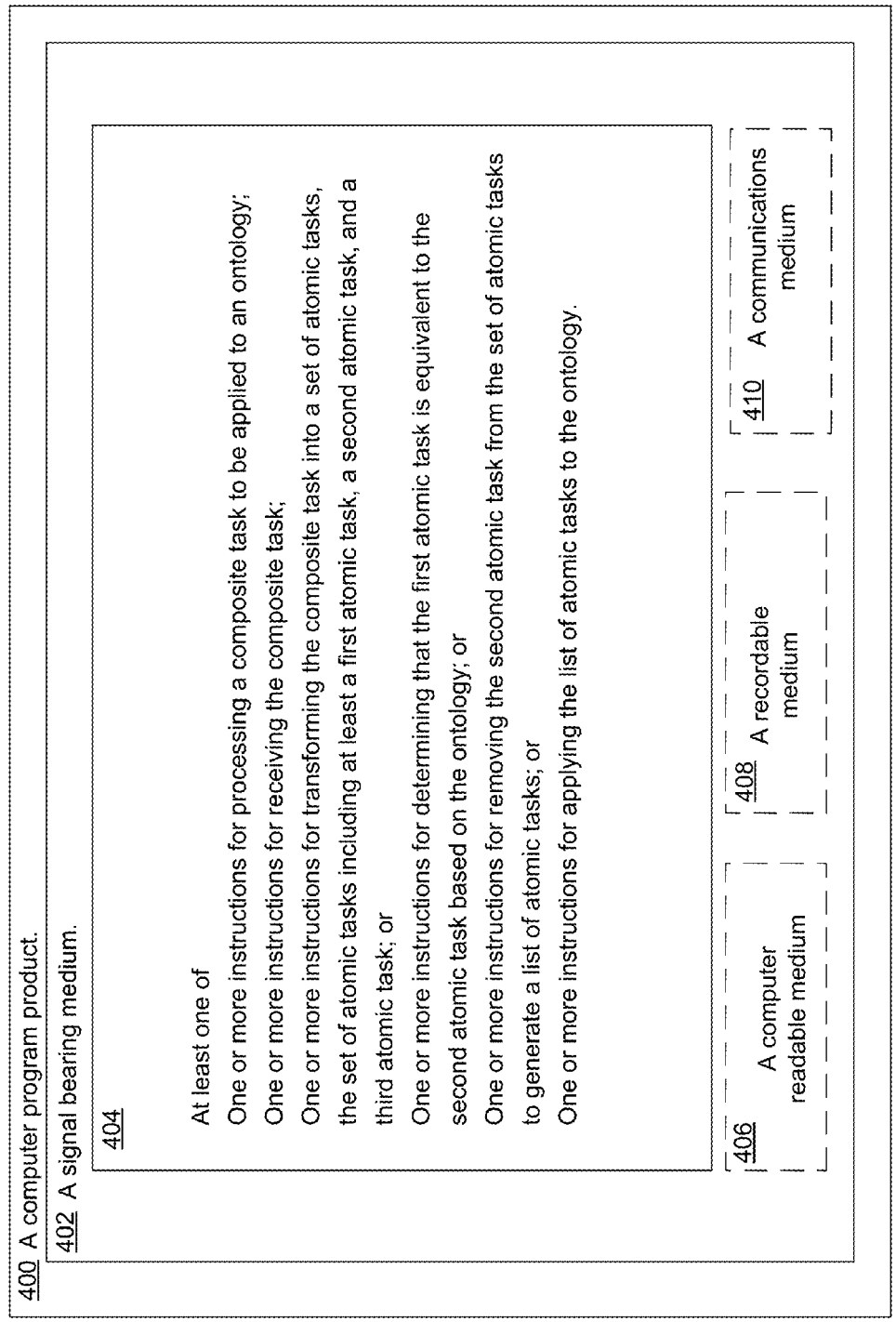
FIG. 4 illustrates computer program products configured to process composite tasks.

FIG. 4 illustrates computer program products 400 configured to process composite tasks, arranged in accordance with at least some embodiments presented herein. Computer program product 400 may include a signal bearing medium 402. Signal bearing medium 402 may include one or more instructions 404 that, when executed by, for example, a processor, may provide the functionality described above with respect to FIGS. 1-3. Thus, for example, referring to system 100, processor 104 may undertake one or more of the blocks shown in FIG. 4 in response to instructions 404 conveyed to the system 100 by signal bearing medium 402.

In some implementations, signal bearing medium 402 may encompass a computer-readable medium 406, such as, but not limited to, a hard disk drive (HDD), a compact disc (CD), a digital video disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). Thus, for example, computer program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

FIG. 5 is a block diagram illustrating an example computing device 500 that is arranged to process composite tasks, arranged in accordance with at least some embodiments presented herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524.

Application 522 may include a composite tasks processing algorithm 526 that is arranged to perform the functions as described herein including those described previously with respect to FIGS. 1-4. Program data 524 may include composite tasks processing data 528 that may be useful for processing of composite tasks as is described herein. In some embodiments, application 522 may be arranged to operate with program data 524 on operating system 520 such that processing of composite tasks may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to process a composite task, the method comprising, by a processor:
   receiving the composite task;
   transforming the composite task into a set of atomic tasks, wherein each atomic task in the set of atomic tasks includes a respective assertion, wherein each atomic task is a subset task of the composite task, and wherein the set of atomic tasks includes at least a first atomic task, a second atomic task, and a third atomic task;
   wherein transforming the composite task into the set of atomic tasks includes:
      transforming the composite task into standard form descriptive logic notation, wherein the standard form descriptive logic notation of the composite task includes inclusion axioms and composite task concepts;
      transforming the inclusion axioms into additional concepts;
      transforming the composite task concepts and the additional concepts into negation normal form concepts; and
      transforming the negation normal form concepts into conjunctions which are used to separate the composite task into the set of atomic tasks;
   determining that the first atomic task is equivalent to the second atomic task based on an ontology;
   removing the second atomic task from the set of atomic tasks, based on the determination of equivalence, to generate a list of atomic tasks, wherein the list includes at least the first atomic task and the third atomic task;
   ordering the list of atomic tasks based on the ontology to produce an ordered list of atomic tasks; and
   processing at least a first selected atomic task in the ordered list of atomic tasks to process the composite task, wherein the ordered list of atomic tasks includes n atomic tasks, and wherein the first selected atomic task is at a position n/2 or (n+1)/2 within the ordered list of atomic tasks.

2. The method of claim 1, further comprising utilizing a semantic relation graph based on the ontology to determine that the first atomic task is equivalent to the second atomic task.

3. The method of claim 2, further comprising determining the semantic relation graph prior to receiving the composite task.

4. The method of claim 1, further comprising utilizing a semantic relation graph to order the list of atomic tasks.

5. The method of claim 1, further comprising, prior to receiving the composite task:
- receiving a first symbol and a second symbol in the ontology;
- determining a semantic relationship between the first symbol and the second symbol; and
- generating a semantic relation graph based on the determined semantic relationship between the first symbol and the second symbol, wherein determining that the first atomic task is equivalent to the second atomic task based on the ontology comprises determining that the first atomic task is equivalent to the second atomic task based on the semantic relation graph.

6. The method of claim 1, further comprising:
- receiving a response to processing of the first selected atomic task; and
- determining not to process a second selected atomic task in the ordered list based on the response to processing of the first selected atomic task.

7. The method of claim 1, further comprising, prior to receiving the composite task:
- receiving a first symbol and a second symbol in the ontology;
- determining a semantic relationship between the first symbol and the second symbol; and
- generating a semantic relation graph based on the determined semantic relationship between the first symbol and the second symbol, wherein ordering the list of atomic tasks based on the ontology to produce the ordered list of atomic tasks comprises ordering the list of atomic tasks based on the semantic relation graph to generate the ordered list of atomic tasks.

8. The method of claim 1, further comprising, prior to receiving the composite task:
- receiving a first symbol and a second symbol in the ontology;
- determining a semantic relationship between the first symbol and the second symbol; and
- generating a semantic relation graph based on the determined semantic relationship between the first symbol and the second symbol,
- wherein determining that the first atomic task is equivalent to the second atomic task based on the ontology comprises determining that the first atomic task is equivalent to the second atomic task based on the semantic relation graph, and
- wherein ordering the list of atomic tasks based on the ontology to produce the ordered list of atomic tasks comprises ordering the list of atomic tasks based on the semantic relation graph to produce the ordered list of atomic tasks.

9. A method to process a composite task, the method comprising, by a processor:
- receiving the composite task;
- transforming the composite task into a set of atomic tasks, wherein each atomic task in the set of atomic tasks includes a respective assertion, wherein each atomic task is a subset task of the composite task, and wherein the set of atomic tasks includes at least a first atomic task, a second atomic task, and a third atomic task;
- wherein transforming the composite task into the set of atomic tasks includes:
  - transforming the composite task into standard form descriptive logic notation, wherein the standard form descriptive logic notation of the composite task includes inclusion axioms and composite task concepts;
  - transforming the inclusion axioms into additional concepts;
  - transforming the composite task concepts and the additional concepts into negation normal form concepts; and
  - transforming the negation normal form concepts into conjunctions which are used to separate the composite task into the set of atomic tasks;
- analyzing a semantic relationship between the first atomic task, the second atomic task, and the third atomic task based on a semantic relation graph, wherein the semantic relation graph is based on an ontology;
- determining a first semantic relationship between the first atomic task and the second atomic task, wherein the first atomic task is more semantically restrictive than the second atomic task;
- determining a second semantic relationship between the second atomic task and the third atomic task, wherein the second atomic task is more semantically restrictive than the third atomic task;
- generating an ordered list of at least the first atomic task, the second atomic task, and
- the third atomic task based at least on the determined first and second semantic relationships; and
- processing at least a first selected atomic task in the ordered list to process the composite task, wherein the ordered list includes n atomic tasks, and wherein the first selected atomic task is at a position n/2 or (n+1)/2 within the ordered list.

10. The method of claim 9, further comprising, prior to receiving the composite task, generating the semantic relation graph by:
- receiving a first symbol and a second symbol in the ontology;
- determining a third semantic relationship between the first symbol and the second symbol in the ontology; and
- generating the semantic relation graph based on the determined third semantic relationship between the first symbol and the second symbol.

11. The method of claim 9, wherein the set of atomic tasks further includes a fourth atomic task, and the method further comprises:
- determining that the first atomic task and the fourth atomic task are equivalent; and
- removing the fourth atomic task from the set of atomic tasks.

12. The method of claim 9, further comprising:
- receiving a response to processing of the first selected atomic task; and
- determining not to process a second selected atomic task in the ordered list based on the response to processing of the first selected atomic task.

13. A device configured to process a composite task, the device comprising:
- a processor;
- a memory that stores an ontology, a semantic relation graph, and instructions, wherein the instructions, when executed by the processor, cause the processor to:
- receive the composite task;
- transform the composite task into a set of atomic tasks, wherein each atomic task in the set of atomic tasks includes a respective assertion, wherein each atomic task is a subset task of the composite task, and wherein the set of atomic tasks includes at least a first atomic task, a second atomic task, and a third atomic task;

wherein the instructions further cause the processor to:
- transform the composite task into standard form descriptive logic notation, wherein the standard form descriptive logic notation of the composite task includes inclusion axioms and composite task concepts;
- transform the inclusion axioms and additional concepts;
- transform the composite task concepts and the additional concepts into negation normal form concepts; and
- transform the negation normal form concepts into conjunctions which are used to separate the composite task into the set of atomic tasks;

determine that the first atomic task is equivalent to the second atomic task based on the semantic relation graph;

remove the second atomic task from the set of atomic tasks, based on the determination of equivalence, to generate a list of atomic tasks, wherein the list includes at least the first atomic task and the third atomic task;

order the list of atomic tasks based on the semantic relation graph; and process at least a first selected atomic task in the ordered list of atomic tasks to process the composite task, wherein the ordered list of atomic tasks includes n atomic tasks, and wherein the first selected atomic task is at a position n/2 or (n+1)/2 within the ordered list of atomic tasks.

14. The device of claim 13, wherein prior to the receipt of the composite task, the instructions further cause the processor to:
- receive a first symbol and a second symbol in the ontology;
- determine a semantic relationship between the first symbol and the second symbol; and
- generate the semantic relation graph based on the determined semantic relationship between the first symbol and the second symbol.

15. The device of claim 13, wherein the instructions further cause the processor to:
- determine a first semantic relationship between the first atomic task and the second atomic task based on the semantic relation graph, wherein the first atomic task is more semantically restrictive than the second atomic task; and
- determine a second semantic relationship between the second atomic task and the third atomic task, wherein the second atomic task is more semantically restrictive than the third atomic task, wherein to order the list of atomic tasks based on the semantic relation graph, the instructions cause the processor to order the list of atomic tasks based on the determined first and second semantic relationships.

16. The device of claim 13, wherein the instructions further cause the processor to:
- receive a response to processing of the first selected atomic task; and
- determine not to process a second selected atomic task in the ordered list based on the response to processing of the first selected atomic task.

* * * * *